United States Patent
Bosch et al.

(10) Patent No.: US 8,564,245 B2
(45) Date of Patent: Oct. 22, 2013

(54) TRACTION BATTERY HAVING INCREASED RELIABILITY

(75) Inventors: Andreas Bosch, Oberriexingen (DE); Sven Gaebler, Stuttgart (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/138,380

(22) PCT Filed: Dec. 15, 2009

(86) PCT No.: PCT/EP2009/067141
§ 371 (c)(1),
(2), (4) Date: Aug. 8, 2011

(87) PCT Pub. No.: WO2010/089001
PCT Pub. Date: Aug. 12, 2010

(65) Prior Publication Data
US 2011/0286137 A1    Nov. 24, 2011

(30) Foreign Application Priority Data
Feb. 6, 2009 (DE) .......................... 10 2009 000 682

(51) Int. Cl.
*H02J 7/00* (2006.01)
(52) U.S. Cl.
USPC ........... 320/116; 320/117; 320/118; 320/119; 320/120; 320/121
(58) Field of Classification Search
USPC ....................................... 320/122
See application file for complete search history.

(56) References Cited

U.S. PATENT DOCUMENTS

| 5,871,858 | A | 2/1999 | Thomsen et al. |
| 6,420,852 | B1 * | 7/2002 | Sato .............................. 320/134 |
| 2006/0091857 | A1 | 5/2006 | Nakanishi et al. |

FOREIGN PATENT DOCUMENTS

| EP | 1566303 A1 | 8/2005 |
| EP | 1655166 A2 | 5/2006 |
| WO | 9535228 A1 | 12/1995 |

\* cited by examiner

*Primary Examiner* — Dharti Patel
(74) *Attorney, Agent, or Firm* — Maginot, Moore & Beck

(57) ABSTRACT

The invention relates to a traction battery having a first battery cell group and a second battery cell group. A first connection of the first battery cell group is connected to a first battery pole by a charging and disconnecting device, a second connection of the first battery cell group is connected to a first service plug connection, a first connection of the second battery cell group is connected to a second service plug connection, and a second connection of the second battery cell group is connected to a second battery pole by a disconnecting device. The first service plug connection and the second service plug connection can be short-circuited by an external service plug. According to the invention, such a traction battery comprises a first jumper connected between the first battery pole and the first service plug connection, by means of which the first battery pole and the first service plug connection can be short-circuited, and/or a second jumper device connected between the second battery pole and the second service plug connection, by means of which the second battery pole and the second service plug connection can be short-circuited.

2 Claims, 3 Drawing Sheets

TRACTION BATTERY HAVING INCREASED RELIABILITY

CROSS-REFERENCE TO RELATED APPLICATION

This application is a 35 USC 371 application of PCT/EP2009/067141 filed on Dec. 15, 2009.

BACKGROUND OF THE INVENTION

1. Field of the Invention

The present invention relates to a battery, in particular a traction battery.

2. Description of the Prior Art

From today's perspective, it is likely that hybrid and electric vehicles will be coming into increasing use in the future. In these vehicle concepts, quite different demands are made of the batteries, compared with the demands made of batteries in today's 12-Volt on-board electrical system. In the present specification, batteries for use in hybrid and electric vehicles are called traction batteries, since they are used for supplying electrical drives. The basic circuit diagram of one such battery is shown in FIG. 2. To achieve the power and energy data demanded for hybrid and electric vehicles, individual battery cells are connected in series and in part in parallel as well. A traction battery based on lithium-ion battery cells for use in hybrid vehicles could be constructed for instance as follows:

Overall Traction Battery:
Rated voltage: 360 V
Capacity: 4 Ah
Energy: 1440 Wh
Individual cell (lithium-ion):
Rated voltage: 3.60 V
Capacity: 4 Ah
Energy: 14.4 Wh The battery comprises a series circuit of 100 cells.

The basic circuit diagram of a drive system for hybrid and electric vehicles is shown in FIG. 3. The electric motor 17 is supplied via an inverter 16. Via the inverter 16, it is possible—for instance in braking operations—for energy to be fed back into the battery 15 as well. The inverter 16 is typically embodied with a smoothing capacitor on its direct voltage side, in order to buffer the input voltage.

Besides the battery cells, the traction battery shown in FIG. 2 has the following further function groups as well:

charging and disconnecting device 3 at the positive pole 4 of the battery
disconnecting device 7 at the negative pole 8 of the battery
surface plug 9

These function groups have the following tasks:

With the two disconnection switches in the disconnecting devices at the positive pole 4 and at the negative pole 8 of the traction battery, the battery cells can be switched off at both poles. This is also called two-pole shutoff of the battery cells. Thus when the vehicle is stopped, or in safety-critical situations (such as an accident), the battery can be disconnected from the traction on-board electrical system of the vehicle, and in the driving mode it can be connected into the traction on-board electrical system.

The charger at the positive pole of the battery has the task of limiting the compensation currents in the traction on-board electrical system upon connecting-in of the traction battery. In such a connecting-in operation, first the disconnection switch in the disconnecting device 7 is closed at the negative pole 8 of the battery, and the charging switch in the charging and disconnecting device 3 is closed at the positive pole 4 of the battery The disconnection switch in the charging and disconnecting device 3 at the positive pole 4 of the battery is first opened. The smoothing capacitor of the inverter 16 is thus charged via the charging resistance of the charging and disconnecting device 3 at the positive pole 4 of the battery. If the voltage at the smoothing capacitor in the inverter 16 has nearly the total voltage of the series-connected battery cells, the disconnection switch in the charging and disconnecting device 3 at the positive pole 4 of the battery is closed. With this procedure, the compensation currents in the traction on-board electrical system can be limited such that both the battery cells and the smoothing capacitor in the inverter 16 are not operated with impermissibly high currents.

For safety reasons, during maintenance work on a battery the surface plug 9 has to be unplugged. This can be ensured for instance by providing that the battery housing can be opened only if the surface plug 9 has first been unplugged. As a result, the battery cells are safely disconnected in single-pole fashion even if because of a malfunction the two disconnection switches described above have not opened.

Markedly more stringent demands in terms of reliability are made of traction batteries than of starter batteries that are usual today. The background of this is that in an electric vehicle, for instance, a failure of the traction battery leads to a so-called "dropout". The high availability required is hard to achieve a traction battery shown in FIG. 2. The reason for this is that the failure of a single battery cell leads to the failure of the entire traction battery. The failure rate of a battery with a series circuit of individual cells can be ascertained as follows:

$$\text{failure rate}_{traction\ battery} = 1 - (1 - \text{failure rate}_{cell})^{number\ of\ cells} \quad (1)$$

For a traction battery with 100 cells, which in the period of time in consideration has a failure rate of 100 ppm/cell, is:

$$\text{failure rate}_{traction\ battery} = 1 - (1 - 100\ \text{ppm})^{100} = 9.95\% \quad (2)$$

At very low failure rates of the battery cells within the period of time in consideration (for instance, failure rate$_{cell}$ <1%), the failure rate can be calculated approximately as follows (breakdown of the exponential series development of the binomial series after the first term):

$$\text{failure rate}_{traction\ battery} \approx \text{number of cells} \ast \text{failure rate}_{cell} \quad (3)$$

Thus the failure rate of the traction battery in question is nearly 100 times as high as the failure rate of an individual cell. Given the values needed for the failure rate of the total battery, the failure rate of the individual cells accordingly has to be lower by a factor of approximately 100. If for a total battery with 100 series-connected cells for a certain period of time a failure of 100 ppm is demanded, the cells in that period of time must have a failure rate of 1 ppm. This is a demand that is extremely difficult to meet.

The object of the invention is to increase the reliability of traction batteries in hybrid and electric vehicles. The traction battery should also still be available with limited power to the traction on-board electrical system.

SUMMARY OF THE INVENTION

The apparatus according to the invention has the advantage by comparison that the traction battery is expanded by one additional jumper switch, and preferably two additional jumper switches, with each of which half of the battery cells can be bridged. As a result, if the first cell fails, the applicable half-battery 1, 2 can be switched off. What are called half-batteries 1, 2 are the series circuit of the cells between the positive pole 4 of the battery and a first outlet to the surface plug (surface plug connection) 5 and the series circuit of the cells between the negative pole 8 of the battery and a second surface plug connection 6, respectively. If one half-battery is bridged, one battery with half the power is still available to the traction on-board electrical system. Thus a dropout can be avoided, and a signal can be sent to the driver that a malfunction in the traction battery requires that the vehicle be taken in for service. Thus the advantage of the invention is that until the first cell failure occurs, the battery can be operated without risking the availability of the battery. In a drive system that immediately fails completely upon a failure of one battery cell, the driver would for instance have to be furnished with a battery replacement indication, which is generated on the basis of a detection and prediction of the battery status. However, since such systems can never exactly determine the remaining service life, the battery must have to be replaced unnecessarily soon, and there is still a residual risk that the battery replacement indication may not be able to detect the failure of the first cell in advance. With the present invention, the reliability of the traction battery is thus markedly increased, on the one hand. On the other, the traction battery can also be operated longer in the vehicle.

Especially preferably, the battery according to the invention includes a charger that is connected parallel to the disconnecting device. In that case, a limitation of the compensation currents in the traction on-board electrical system is ensured even if a failure of the first battery cell group occurs.

The apparatus according to the invention furthermore, additionally or alternatively, preferably includes a first detection device, which detects a function of the first battery cell group and upon a malfunction of the first battery cell group causes an opening of the connection of the first terminal of the first battery cell group with the first battery pole via the charging and disconnecting device and a closure of the connection between the first battery pole and the first surface plug connection via the first jumper device; and/or a second detection device, which detects a function of the second battery cell group and upon a malfunction of the second battery cell group causes an opening of the connection of the second terminal of the second battery cell group with the second battery pole via the disconnecting device and a closure of the connection between the second battery pole and the second surface plug connection via the second jumper device.

BRIEF DESCRIPTION OF THE DRAWINGS

One exemplary embodiment of the invention will be described in detail below in conjunction with the accompanying drawings. In the drawings.

DESCRIPTION OF THE PREFERRED EMBODIMENT

Figure 1:
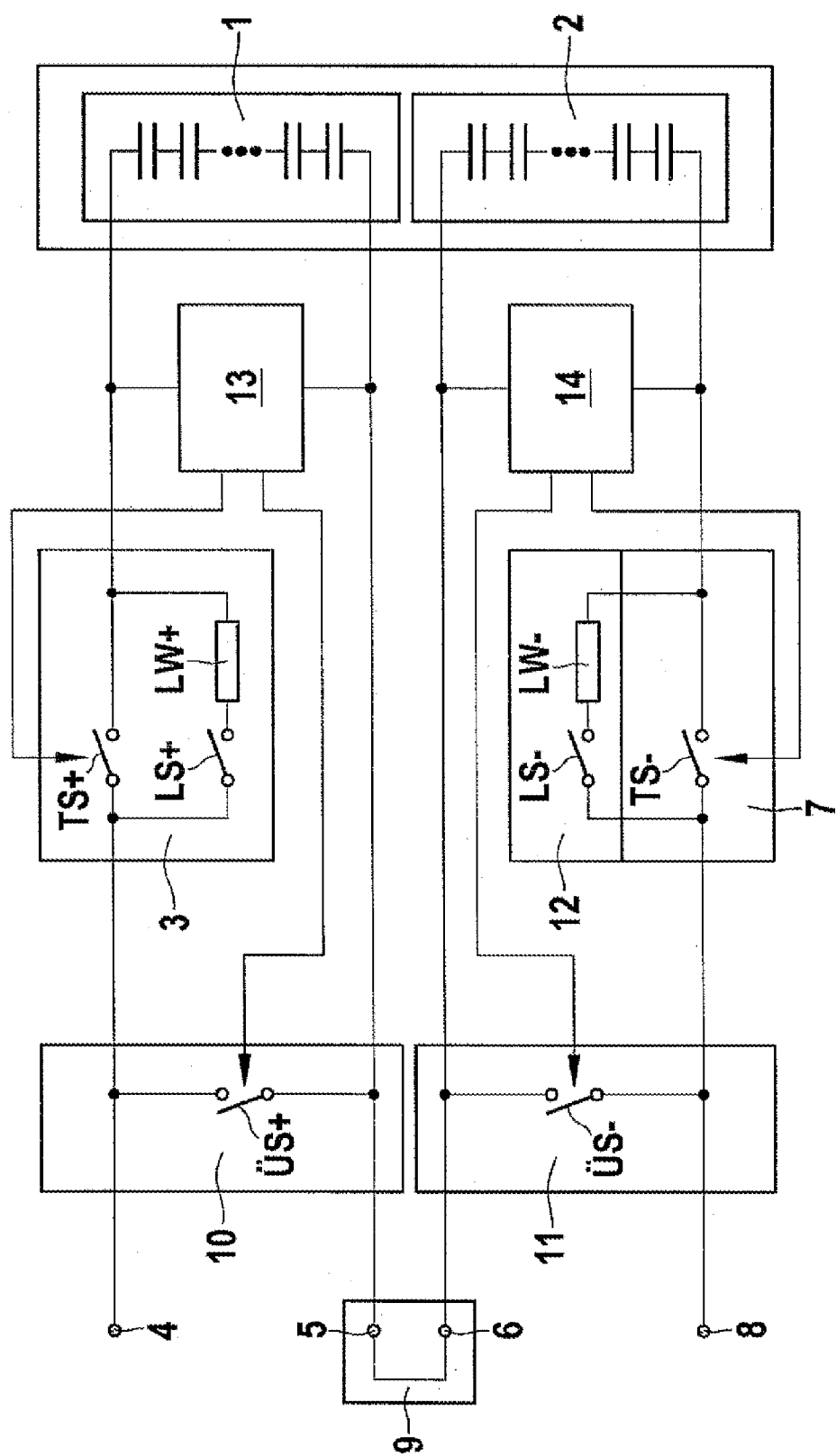
FIG. 1 is a basic circuit diagram of a battery, preferably a traction battery, in a preferred embodiment of the invention.
Figure 2:
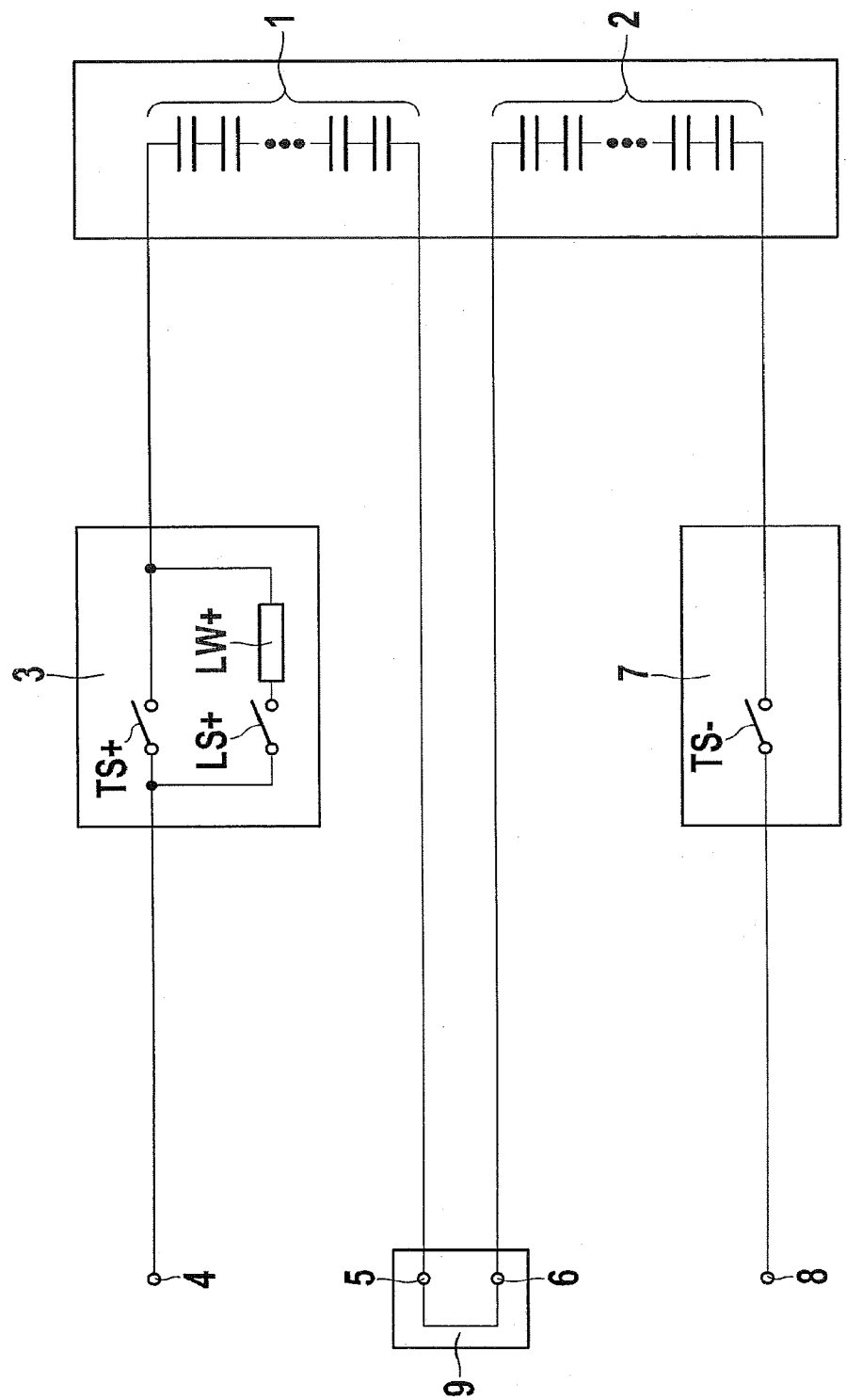
FIG. 2 is a basic circuit diagram of a traction battery in the prior art.
Figure 3:
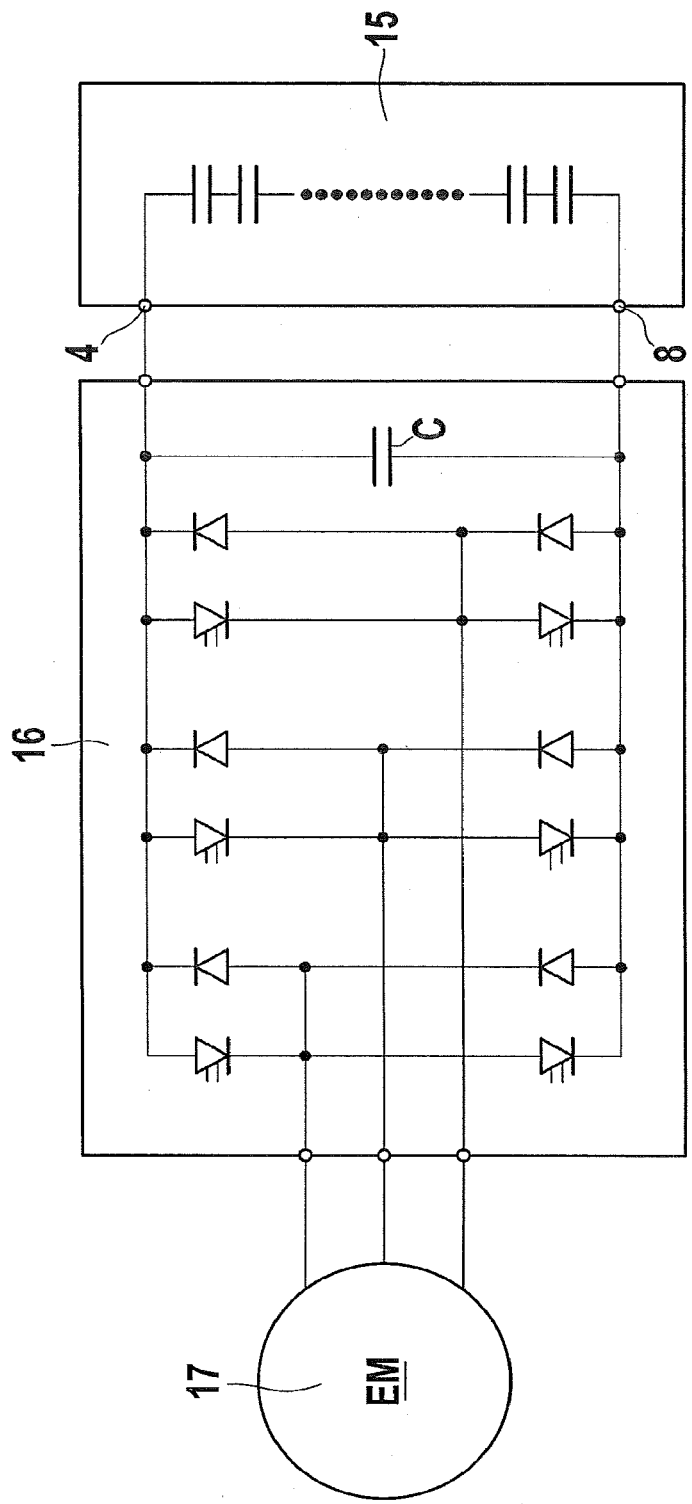
FIG. 3 is a basic circuit diagram of a drive system which is used in hybrid and electric vehicles.

The reliability of a traction battery is increased considerably according to the invention compared to the prior art, since the failure of an individual cell does not lead directly to the failure of the system (dropout). In a preferred embodiment of the invention, for that purpose—as shown in FIG. 1—two jumper switches are additionally introduced into two jumper units 10, 11 (at the positive pole 4 and the negative pole 8 of the battery). If the first cell fails, as detected by the detection circuit 13, which in the present prior art would lead to opening of the two disconnection switches, the procedure is as follows:

Cell in Half-Battery at the Positive Pole Fails:

The switches TS+ and LS+ of the charging and disconnecting device 3 at the positive pole 4 of the battery are opened. As a result, the upper half-battery 1 is switched off in single-pole fashion. In the disconnecting device 7 at the negative pole 8 of the battery, the disconnection switches TS– are opened, and in the charger 12 at the negative pole 8, the charging switch LS– is closed. In addition, the jumper switch US+ in the jumper unit 10 at the positive pole 4 of the battery is closed. As a result, the upper half-battery 1 is bridged. The smoothing capacitor in the inverter 16 is charged or recharged to the total voltage of the cells of the lower half-battery 2 via the charging resistance of the charger 12. If the voltage at the smoothing capacitor has virtually the total voltage of the lower half-battery 2, the disconnection switch in the disconnecting device 7 at the negative pole 8 of the battery is closed. At the positive pole 4 and negative pole 8 of the traction battery, a battery with half the voltage and unchanged capacity is thereafter available. The power and energy of the battery are as a result divided in half compared to regular mode of operation.

Cell in Half-Battery at the Negative Pole Fails:

The procedure in the event of failure of a cell in the upper half-battery 1 is performed analogously, with the roles of the charging and disconnecting devices 3; 7, 12 of the jumper devices 10, 11 and of the two half-batteries 1; 2 transposed. After that, at the positive pole 4 and negative pole 8 of the traction battery, a battery with half the voltage and unchanged capacity is once again available. The power and energy of the battery are as a result divided in half compared to regular mode of operation.

With the use of the present invention, after the failure of one cell of the traction battery, the electrical drive system of a hybrid or electric vehicle can still be operated with half the power and half the energy. As a result, a dropout caused by failure of a single cell can be avoided.

This advantage can be utilized so that the battery can be operated longer in the vehicle without risking high likelihood of a dropout at the end of the battery service life.

The various switches in the charging and disconnecting devices 3; '7, 12 and the jumper devices 10; 11 can be embodied according to the invention as electromechanical or electronic switches or as combinations of electromechanical and electronic switches.

Besides the written disclosure above, the disclosure in the drawings is here referred to expressly.

The foregoing relates to the preferred exemplary embodiment of the invention, it being understood that other variants and embodiments thereof are possible within the spirit and scope of the invention, the latter being defined by the appended claims.

The invention claimed is:

1. A battery, in particular a traction battery, having:
   a first battery cell group and a second battery cell group, each cell group including a plurality of battery cells, in which
   a first terminal of the first battery cell group is connected to a first battery pole via a charging and disconnecting device,
   a second terminal of the first battery cell group is connected to a first surface plug connection,
   a first terminal of the second battery cell group is connected to a second surface plug connection, a second terminal of the second battery cell group is connected to a second battery pole via a charging and disconnecting device, and the first surface plug connection and the second surface plug connection can be short-circuited via an external surface plug; and a first jumper device, which is connected between the first battery pole and the first surface plug connection, by way of which jumper device the first battery pole and the first surface plug connection can be short-circuited; and a second jumper device, which is connected between the second battery pole and the second surface plug connection, by way of which jumper device the second battery pole and the second surface plug connection can be short-circuited, wherein the charging and disconnecting devices associated with the first and second terminals are separate from each other and each includes a separate charger connected in parallel to a corresponding disconnecting device.

2. The battery as defined by claim 1, further having:

a first detection device, which detects a function of the first battery cell group and upon a malfunction of the first battery cell group causes an opening of the connection of the first terminal of the first battery cell group with the first battery pole via the charging and disconnecting device and a closure of the connection between the first battery pole and the first surface plug connection via the first jumper device; and/or a second detection device, which detects a function of the second battery cell group and upon a malfunction of the second battery cell group causes an opening of the connection of the second terminal of the second battery cell group with the second battery pole via the disconnecting device and a closure of the connection between the second battery pole and the second surface plug connection via the second jumper device.

\* \* \* \* \*